United States Patent Office 3,500,990
Patented Mar. 17, 1970

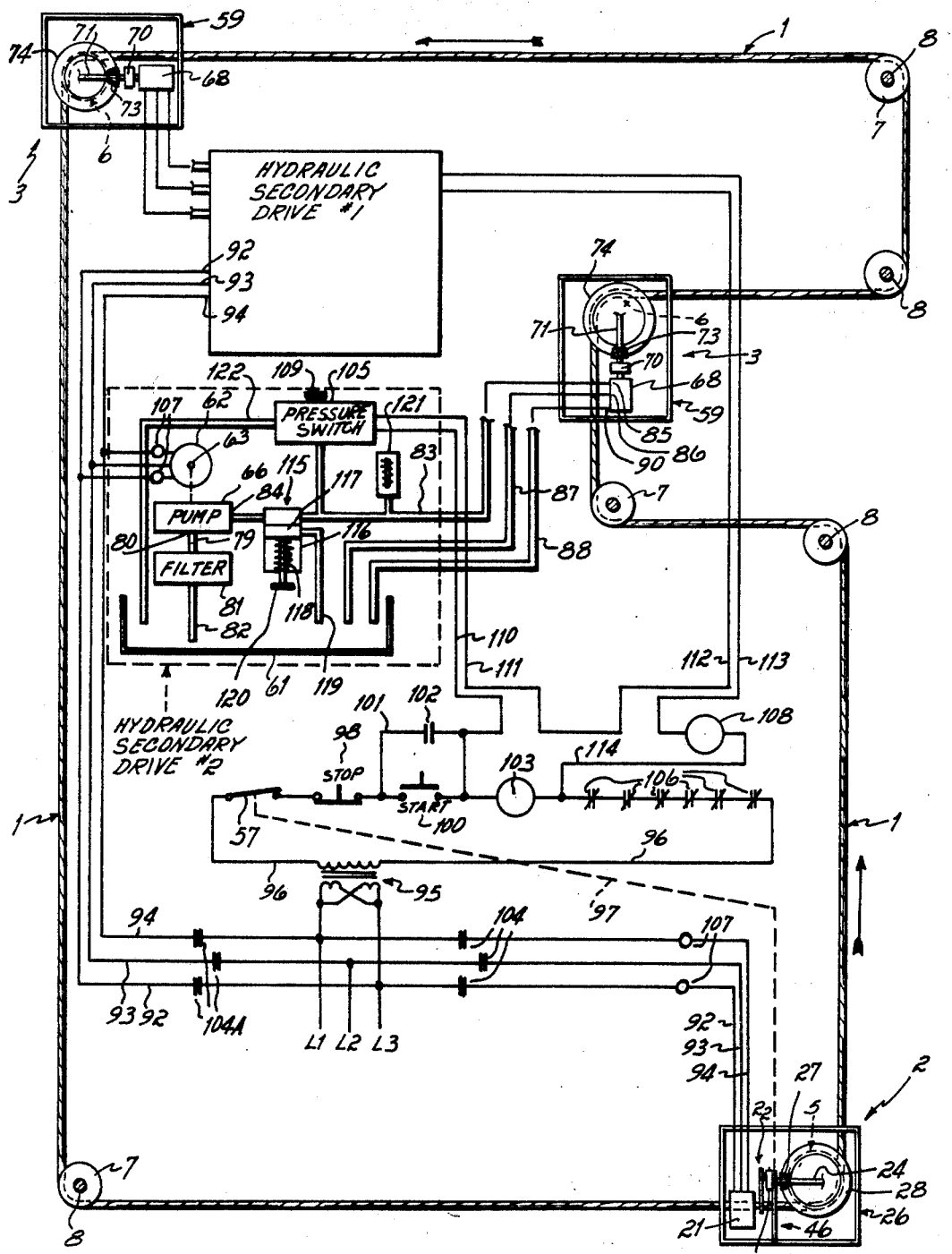

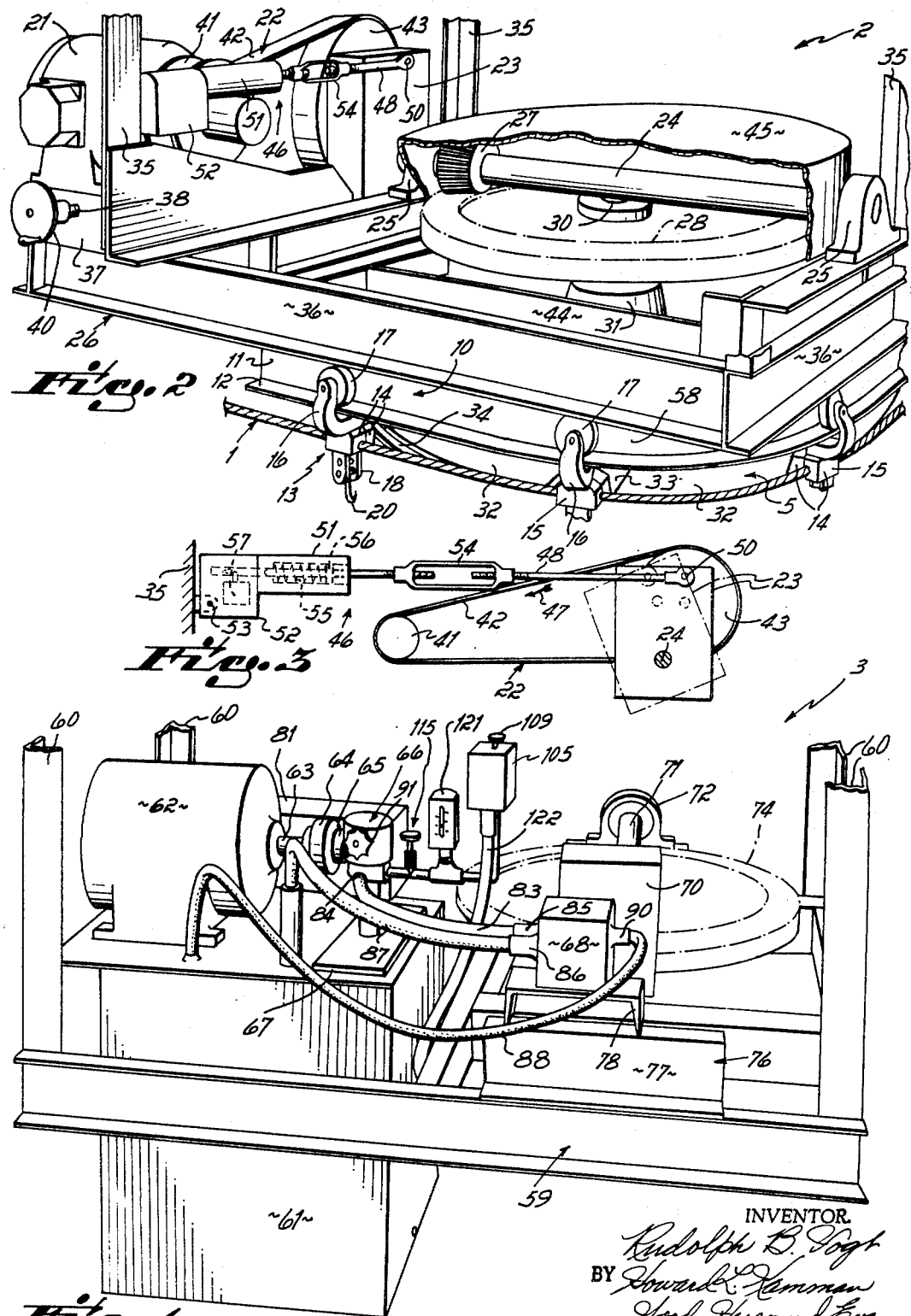

3,500,990
CONVEYOR DRIVING SYSTEM
Rudolph B. Vogt and Howard L. Kamman, Cincinnati, Ohio, assignors to The E. W. Buschman Company, Inc., Cincinnati, Ohio, a corporation of Ohio
Filed Dec. 29, 1967, Ser. No. 694,737
Int. Cl. B65g 23/36
U.S. Cl. 198—203                     15 Claims

ABSTRACT OF THE DISCLOSURE

A driving system for overhead conveyors having trolleys connected to a cable and suspending the articles for transport. The system includes an electrically driven primary driving unit and one or more hydraulically powered secondary driving units, all in driving connection with the cable run at spaced points. The primary and secondary driving units are interconnected with one another through an electrical-hydraulic control circuit having adjustment means arranged to equalize the load among the several driving units, such that each unit transmits a substantially equal driving force, in tension, to the cable run at the several points throughout its length.

SUMMARY OF THE INVENTION

The invention is directed generally to the concept of a conveyor system incorporating a primary driving unit electrically driven and one or more secondary driving units, hydraulically driven and operating in concert with the primary driving unit.

A primary objective of the invention has been to provide a driving system for cable type conveyors in which a plurality of driving units are employed to equalize the tension driving force which is imparted to the cable run, thereby to prevent overloading of the cable run.

According to this aspect of the invention, the driving system may comprise on primary driving unit which is driven by an electrical motor and operating in harmony with one or more secondary driving units which assist the primary unit. The secondary driving units are also electrically powered but impart their power output to the cable run through adjustable hydraulic driving systems, whereby the secondary driving units may be regulated hydraulically to apply a substantially equalized pulling force to the cable run at the several points throughout the conveyor system.

A further objective has been to provide a driving system of this type in which each of the hydraulic secondary driving units is self-contained, and in which each is adjustable individually with reference to the other, with an electrical control system, common to the several driving units for correlating the power output of the primary and secondary driving units.

According to this objective, the primary driving unit comprises an electrical power motor in mechanical driving connection through a reduction gear box and sheave with the conveyor run. Each self-contained, secondary drive unit comprises a reservoir or sump confining the hydraulic fluid, a secondary motor driving a hydraulic pump mounted relative to the reservoir, and a hydraulic motor in hydraulic connection with the pump for driving the cable run hydraulically through a gear reduction unit and sheave. According to this concept, the system is flexible in that any required number of self-contained secondary driving units may be installed in conjunction with one primary driving unit at various remote points along the conveyor run to assist the primary unit and to prevent tension overloading in localized areas throughout the entire conveyor run.

A further objective has been to provide a combined electrical-hydraulic control system, the two systems interconnected and including hydraulic power regulating means, whereby the operation of the primary and secondary driving units may be correlated to provide a relatively equalized work load throughout the conveyor run and in which the operation of the primary driving unit depends upon the delivery by the secondary driving units of their predetermined work load.

In general, this aspect is carried out by means of hydraulic, pressure-responsive regulating switches incorporated in the hydraulic circuit of each of the self-contained secondary driving units and interconnected in the electrical control circuit which regulates the operation of the primary drive electrical motor. The arrangement is such that each of the several secondary units must deliver its assigned power, otherwise the pressure-responsive hydraulic switch prevents the primary motor from being energized. On the other hand, if the primary drive unit is mechanically overloaded, then it trips a switch, shutting down the entire drive system to prevent damage to the conveyor run.

The various features and advantages of the invention will be more clearly apparent to those skilled in the art from the specification in conjunction with the drawings.

DRAWINGS

FIGURE 1 is a schematic view illustrating a typical cable type trolley conveyor system having a primary driving unit and two secondary units and showing the hydraulic and the electrical control circuits which interconnect the primary driving unit with the hydraulic secondary driving units.

FIGURE 2 is a perspective view illustrating the primary driving unit and a portion of the cable driven trolley conveyor in driving connection with the primary driving unit.

FIGURE 3 is a diagrammatic side view, partially in cross section, illustrating the mechanical overload tripping apparatus which is associated with the primary driving unit.

FIGURE 4 is a perspective view illustrating one of the self-contained hydraulically driven secondary driving units.

PREFERRED EMBODIMENT

General arrangement

A simplified conveyor system, selected to illustrate the principles of the invention, is shown diagrammatically in FIGURE 1. In the selected example, the conveyor is of the overhead trolley cable type, having an endless power cable run, indicated generally at 1, driven by a primary drive unit, indicated generally at 2, and having two hydraulically operated secondary drive or "slave" units, indicated generally at 3. In the example illustrated, the primary drive unit 2 is powered by an electric motor 21 and the secondary drive units 3—3 assist the primary drive unit at points along the conveyor system as to prevent overloading of the cable 1.

The endless cable run 1, in practice, may extend throughout an entire plant in which the conveyor length is such that additional power must be applied at various points in order to advance the cable run without overstraining the cable run 1 on the tension side, that is, the side downstream from the primary drive unit 2.

Described with reference to FIGURE 1, the primary drive unit 2 includes a drive sheave indicated generally at 5, and each secondary drive unit 3 includes a similar driving sheave which is indicated generally at 6. The driving sheaves 5 and 6 of the driving units preferably are provided with driving segments (not shown) which engage driving lugs attached to the cable and forming a part of the conveyor trolleys as explained later, thereby to provide a positive driving connection between the sheaves and the endless cable run 1. As shown in FIGURE 1, the primary and secondary driving units 2 and 3 are located at the turns of the conveyor run such that the cable passes around a portion of the sheave to provide engagement with several of the driving lugs in passing about the sheave.

A conveyor system of a length requiring the secondary drive units 3 is extended at various angles so as to advance through the several areas of a given plant which may be offset from the main working or loading area. The cable run 1 thus includes turn sections, extending usually at right angles, which advance through the offset areas and the system includes idler sheaves 7 at the turns. The idler sheaves are generally similar to the driving sheaves 5 and 6, but having a smaller diameter. The several idler sheaves 7 are rotatably journalled upon idler shafts 8 which are carried by the framework of the conveyor system.

It will be understood that the driving system of the invention may be applied to various types of conveyor systems, either to the overhead trolley type, which is illustrated, or to other types, for example, conveyor systems which the conveyor includes a flat supporting surface on which the articles rest by gravity for transport. In the overhead cable type conveyor which is illustrated, the endless cable run 1 includes a conveyor rail indicated generally at 10 (FIGURE 2) which may comprise a steel structural member having a central web 11, with horizontal flanges 12—12 projecting outwardly in opposite directions from the lower edge of web 11. The rail 10 is supported in a conventional way by the framework (not shown), usually an overhead structure depending downwardly from the roof or ceiling structure of the plant.

In the present example, the articles are suspended from individual conveyor trolleys, indicated generally at 13, which are tracked upon the opposed flanges 12 of the conveyor rail and propelled by the cable run 1 (FIGURE 1). Each trolley 13 is anchored at fixed intervals to the cable 1 at a spacing in accordance with the requirements of a given plant and at uniform spacing. For example, the cable 1 may be provided with driving lugs (not shown) engaged to the cable at precise spacing such that the trolleys may be mounted upon the lugs at the lug spacing or at some multiple of the lug spacing, in accordance with the type and size of the articles which are being transported. A conveyor cable and trolley system of this type is disclosed in Patent No. 2,633,226, issued to Adolph B. Vogt on Mar. 31, 1953.

The trolleys 13, which preferably are constructed according to the patent, comprise half-sections 14—14 consisting of forgings or castings of duplicate construction. Each pair of mating half sections in assembly form a driving block 15 which includes a semi-cylindrical cavity or recess embracing the cylindrical driving lug (not shown) which is swaged upon the cable 1 at fixed intervals.

Each half section of the trolley includes a trolley arm rising upwardly from block 15, with a roller 17 journalled upon the upper end of each limb 16 and is tracked on the flange 12 at opposite sides. Thus, in assembly, the two half sections 14 of the trolley enclose the driving lug of the cable 1 to provide a driving connection with the cable. The lower end of each trolley half section includes a depending hanger 18, with a hook 20 pivotally suspended from the spaced hangers 18—18 of the assembled trolley for supporting the articles which are transported.

The cable 1, according to the aforesaid patent, may be furnished in prefabricated lengths, each length having the required number of driving lugs swaged thereon at the required spacing, with lugs at opposite ends which are one-half the length of the intermediate lugs. Accordingly, the trolleys are utilized in joining the ends of the cable sections, two half lugs being confined in the half sections of a given trolley to connect the sections. This construction relieves torque strains in the cable, since the several cable lengths are free to rotate relative to one another in response to strains which may develop in service.

Primary drive unit

The primary drive unit (FIGURE 2) comprises an electrical, primary drive motor 21 connected by a variable speed pulley system, generally indicated at 22, to a gear reduction unit 23. The gear reduction unit 23 includes a horizontal output power shaft 24 journalled in pillow blocks 25—25 mounted upon a support frame 26 formed of structural steel members.

The drive from motor 21 is completed to the cable run 1 through a pinion 27 keyed to output shaft 24 and meshing with a bevel gear 28. The bevel gear 28 is keyed to a vertical shaft 30 journalled in a bearing 31 which is carried by the frame 26. The lower end of shaft 30 projects downwardly below the bearing 31, the driving sheave 5 of the primary drive unit being keyed to the lower end portion of the vertical drive shaft 30.

The sheave 5 is of composite design and includes a series of driving segments 32 which are bolted to the driving shaft 5 and spaced radially from one another to provide openings 33 for the reception of the block portions 15 of the trolleys, thereby to provide a positive driving connection with the cable. The periphery of each drive segment is grooved as at 34 to receive the cable 1.

The frame 26 is suspended from the overhead building structure by vertical hangers formed of structural steel members 35 having lower end portions attached to the frame 26. The frame 26 is rectangular and is fabricated from channel members 36 suitably joined together as by welding. The primary drive motor 21 (FIGURE 2) is slideably mounted upon an adjustment base 37 of conventional design which permits the motor to be shifted relative to the horizontal output shaft 24 of the gear reduction unit 23 so as to permit adjustment of the variable speed pulley system 22.

For shifting the motor, there is provided a screw shaft 38 journalled in the adjustment base 37 and including an adjustment knob 40, the arrangement being such that rotation of the adjustment shaft 38 shifts the motor 21 in the horizontal plane.

The variable speed driving system 22 comprises the variable pitch pulley 41 mounted upon the shaft of motor 21 and having a belt 42 trained about a pulley 43 which drives the gear reduction unit 23. The variable speed pulley system 22 is conventional; however, it will be understood that adjustment of the motor 21 by operation of knob 40 changes the ratio of the pulley drive and thereby regulates the rate of advancement of the power cable 1.

In the form illustrated (FIGURE 2), the bearing 31, in which the vertical shaft 30 is journalled, is mounted within a secondary frame 44 rigidly secured within the main frame 26. The pillow blocks 25—25, journalling the horizontal output shaft 24, are also rigidly connected to the main frame 26 as is the gear reduction unit 23. In the present example, a circular cover 45 is mounted upon the secondary frame 44 to enclose and protect the driving components.

In order to protect the conveyor system from damage or failure in the event of overload conditions, the primary drive unit (FIGURES 2 and 3) is provided with an overload release mechanism, indicated generally at 46. For this purpose, the gear reduction unit 23 is journalled about the axis of the horizontal output shaft 24 for rocking motion relative to the main support frame 26. The turning force is transmitted from the pulley 41 of motor 21 in the direction indicated by the arrow 47 in FIGURE 2, thus tending to swing the gear reduction unit 23 in the direction indicated in broken lines. This force is resisted by a torque arm 48 having one end pivotally connected as at 50 to the gear reduction unit 23. The oposite end portion of torque arm 48 passes slideably through an adjustment thimble 51.

The adjustment thimble 51 projects from a switch box 52 which is pivotally connected as at 53 to one of the vertical hangers 35 of frame 26. In order to provide adjustment, the torque arm 48 includes a turnbuckle 54 at a mid-point along its length.

The adjustment thimble 51 includes an internal bore, with a compression spring 55 seated against one end of the bore, with its opposite end seated against a collar 56 secured to the torque arm 48. The inner end portion of the torque arm 48 passes beyond the compression spring and into the switch box 52. An overload switch 57 is mounted within the switch box 52 and includes a plunger bearing against the torque arm 48. The arrangement is such that an overload condition or stoppage of the conveyor system (power cable 1) beyond a predetermined value, as determined by the adjustment of turnbuckle 54, causes the belt to rock the gear reduction unit 23 in the direction indicated by the broken lines (FIGURE 3), thus compressing spring 55 and causing the end of torque arm 48 to trip the overload switch 57. Switch 57 is interconnected in the control circuit to de-energize the motor 21 upon being tripped, as explained later.

As shown in FIGURE 2, the conveyor rail 10 provides a ninety degree turn at the primary drive unit 2. The turn section 58 is developed about an axis which is common to the vertical axis of shaft 30. As noted earlier, the primary drive unit 2 and the secondary drive units 3, as shown diagrammatically in FIGURE 1, are all located at turns in which the power cable describes a turn of one-hundred eighty degrees, or at some other angle, as determined by installation requirements.

Secondary drive unit

The secondary drive units 3—3 of the conveyor run are of duplicate construction (FIGURE 4). As noted earlier, these units are located at various turns along the power cable 1 to assist the primary drive unit and prevent overloading of the power cable at various areas throughout the installation. Each secondary drive unit 3 is self-contained and includes its own electrical power motor and other components, as illustrated in FIGURE 4.

Described in detail, each secondary drive unit includes a rectangular frame 59 fabricated from structural steel members, generally as described with reference to the primary drive unit shown in FIGURE 1. The frame 59 is suspended from the overhead building structure by vertical hangers 60 having their lower end portions secured to the corners of the frame 59.

In general (FIGURES 1 and 4), each secondary drive unit comprises a reservoir 61 for the hydraulic fluid, which also serves as a sump, with an electrical power motor 62 mounted upon the reservoir 61. In the form illustrated, the reservoir 61 is of rectangular design and is attached to the frame 59 for support, the self-contained secondary drive unit being supported above the floor level with its driving sheave 6 located in the plane of the power cable 1. The electrical power motor 62 includes a power shaft 63, including a coupling 64 providing a driving connection with the shaft 65 of a hydraulic pump, indicated generally at 66.

Pump 66 is of commercial design and is of the positive displacement type having adjusting means for regulating pump displacement, as explained later. The pump 66, as a unit, is supported by a bracket 67 secured to the top of the reservoir 61, with the axis of its shaft 65 aligned with the axis of motor shaft 63. The pump 66 is connected to a haydraulic motor 68 which is mechanically connected to a gear reduction unit 70, similar to the gear reduction unit 23 described earlier with respect to the primary drive unit 2.

As described earlier with reference to primary drive unit 2, the gear reduction unit 70 includes a horizontal output shaft 71 journalled in pillow blocks 72 and including a pinion 73 meshing with a bevel gear 74 (FIGURES 1 and 4). The bevel gear 74 is keyed to a vertical shaft, similar to shaft 30 of the primary drive unit 2, and the lower end portion of the shaft projects downwardly below frame 59, the sheave 6 of the secondary drive unit being keyed to the lower end portion of the vertical shaft.

The hydraulic motor 68, gear reduction unit and bevel gear drive are carried upon the frame 59, with the centers of the horizontal output shaft 71 and the vertical shaft 75 percisely related to one another (FIGURE 4). For this purpose, there is provided a mounting frame, indicated generally at 76, which is attached to the main frame 59. Mounting frame 76 essentially comprises a pair of channel irons 77—77 mounted upon the upper surface of frame 59 at opposite sides.

The hydraulic motor 68 and gear reduction box 70 are mounted upon a channel piece 78 carried by the frame 76. The pillow blocks 72, in which the horizontal output shaft 71 is journalled, are carried by a similar cross channel 78. The bearing for the vertical shaft, which is similar to the bearing 31 of the primary drive unit, is also carried by the mounting frame 76 so as to rotatably journal the bevel gear 74 in precise relationship to output shaft 71 and its pinion 73.

The hydraulic pump 66 (FIGURES 1 and 4) is connected with the reservoir 61 by way of a hydraulic conduit 79 connected to the intake port 80 of the pump 66. In order to prevent the circulation of foreign particles through the hydraulic pump and motor 68, a filter 81 is installed upon the top of the reservoir and includes an intake conduit 82 (FIGURE 1) which extends downwardly into the reservoir. The intake conduit 82 is connected to the bottom of the filter 81, the filter being connected to the intake port 80 of the pump. The filter is of a commercial design and is of a type which includes an external indicator (not shown) which signals the presence of trapped foreign material and the need for cleaning.

The pump 66 includes a pressure conduit 83 communicating with its pressure port 84 and connected to the intake port 85 of the hydraulic motor 68. The fluid is returned to the reservoir or sump 61 from the exhaust port 86 of the hydraulic motor by way of the exhaust conduit 87. In the present example, the hydraulic motor includes a third conduit 88 leading from a drainage port 90 back to the reservoir 61. The conduit 88 conveys internal leakage from the pump back to the reservoir.

The hydraulic pump 66, as noted earlier, comprises a commercial, positive displacement unit arranged for variable delivery. By way of example, the pump may be of the swash plate type having radially arranged pistons, the stroke being regulated by the angle of the swash plate. The angle of the swash plate, in turn, may be varied by an internal mechanism (not shown) connected to the swash plate for changing the pump displacement according to the requirements of a given conveyor system so as to regulate the speed of the hydraulic motor 68 and, hence, the speed of the secondary drive unit. In the present example, the pump output is adjusted by means of a knob 91 (FIGURE 4) which is accessible externally.

The hydraulic motor 68 is also a positive displacement unit preferably of the vane type, although other commercial motors having the required rating may be utilized. The motor, in the present example, may comprise a rotor having radial slots, with vanes slideably confined in the slots of the rotor and with suitable cam means slideably engaging the ends of the vanes to cause fluid displacement. The motor, therefore, is driven at a predetermined speed in response to the adjustment setting of knob 91 of the hydraulic pump. The hydraulic system includes the necessary valves, pressure gauges, and pressure-responsive switches, as explained later with reference to the circuit diagram.

Electrical control circuit

Referring to FIGURE 1, which illustrates a simplified conveyor layout, the electrical control circuit is shown combined with the hydraulic circuits which regulate the operation of the primary and secondary drive units. As explained earlier, any required number of hydraulic secondary drives may be utilized in connection with a single primary drive 2, depending upon the length or power requirements of the conveyor system. As shown in the diagram, which illustrates two hydraulic secondary drives —3, each drive is operated by its own self-contained hydraulic system indicated in the drawings as secondary hydraulic drives No. 1 and No. 2. The circuit for the secondary drive No. 2 is shown in the diagram, drive No. 1, being a duplicate, is shown in block form.

Described in detail, the electrical circuit is powered by the three-phase 220 volt power lines, indicated at L1, L2, and L3. These lines are connected to the branch power lines 92, 93 and 94 which energize the electric primary drive motor 21 and the electric motors 62 of the secondary drives No. 1 and No. 2.

The secondary drive motors 62—62 and the primary drive motor 21 are regulated by a secondary control circuit, in the present example, 110 volt, which is powered by a transformer 95 having a primary winding connected to the three-phase power lines L1, L2, and L3. The secondary circuit includes a branch line 96 in series with the secondary winding of the transformer 95. The overload switch 57, previously described with reference to FIGURE 3, is inserted in the branch line 96 to open the control circuit in the event of a mechanical conveyor overload of sufficient magnitude to trip the switch, as explained earlier. The mechanical connection from the gear reduction box 23 (FIGURE 3) to the switch, as indicated by the broken line 97 in FIGURE 1.

The branch line 96 of the control circuit includes a normally closed stop switch 98 of the push-button type and a normally open starting switch 100, also of the push-button type. The two switches 98 and 100 are interposed in series in line 96 of the control circuit.

Since starting switch 100 is closed only momentarily when the conveyor is energized, there is provided a holding circuit 101 shunting the contacts of starting switch 100 and including holding contacts 102 interposed in the holding circuit 101. A holding relay coil 103 is interposed in the branch line 96 and is mechanically connected to the holding contacts 102. Accordingly, when starting switch 100 is closed momentarily, relay winding 103 is energized to close the holding contacts 102 to complete the holding circuit shunting around the switch 100 so as to maintain the holding circuit until it is interrupted either by the stop button 98 or by the overload switch 57. When either of these two switches is opened, holding relay winding 103 is de-energized so as to open the holding contacts 102.

As explained below, the holding relay 103, upon being energized, in addition to maintaining the holding circuit 101, also closes the power contacts 104 of the primary motor 21 and the contacts 104–A of secondary motors 62 which are interposed in the power lines 92, 93 and 94 for energizing the two motors.

It will be understood, at this point, that the control circuit is arranged to prevent the primary motor 21 from being energized until the hydraulic circuits No. 1 and No. 2 are operating. As explained later, each secondary drive unit 3 includes a pressure switch 105 having a pressure adjustment screw 109. The pressure switch 105 is interconnected in the electrical control circuit and hydraulically interconnected with the hydraulic circuit. In addition to the holding relay 103, the control circuit 96 also includes a series of overload switches 106 which are normally closed. These switches are conventionally and are operated by overload coil elements 107 which are interposed in the power lines 92 and 94 of the several motors.

After both electrical secondary motors 62 are in operation, the relay winding 108 of the primary electric motor 21 is closed in response to the closing of the contacts of both pressure switches 105. For this purpose, a branch control line 110 extends from secondary control line 96 and to the pressure switch 105 of secondary drive No. 1. The circuit through the pressure switch 105 is completed by a second branch line 111 leading to a branch line 112.

Branch line 112 leads to the contacts of the second pressure switch 105 of drive No. 1 and the circuit is completed through the second pressure switch 105 from line 112 to a branch line 113. When the contacts of both pressure switches 105—105 are closed, the circuit is completed by way of the two sets of branch lines 110–111 and 112–113 through the winding of relay 108 and by way of branch line 114 to the control circuit 96 to energize the relay 108. Upon being energized, relay 108 closes the power contacts 104 in the power lines 92, 93 and 94 leading to the primary motor 21, thus commissioning the primary drive unit 2.

Hydraulic circuit

As noted earlier, the hydraulic secondary drives No. 1 and No. 2 are in duplicate, the details of drive No. 2 being illustrated. As shown diagrammatically (FIGURE 1) each secondary drive motor 62 is in driving connection with the pump 66, as previously described and includes the filter, previously indicated at 69. The filter is in communication with the lower portion of the reservoir 61 by way of the intake conduit 82. The hydraulic fluid is thus passed through filter 69 by way of the intake conduit 82 to the pump 66.

From the pump, the fluid pressure is conducted by way of pressure conduit 83 to the pressure regulator 115. The pressure regulator, as shown diagrammatically, includes a cylinder 116 having a piston 117, with a compression spring 118 seated against the piston. An adjustment screw 120 is threaded through one end of the cylinder 116 and has its inner end seated against the end of the compression spring 118. Adjustment of the screw 120 thus controls the pressure of the hydraulic fluid flowing by way of pressure conduit 83 from the pump 66 to the hydraulic motor 68 by way of the pressure conduit. During operation at its setting, a certain amount of hydraulic fluid, which may bypass across piston 117, due to pressure surges, returns to the reservoir by way of conduit 119. The pressure regulator 115 is used in initially setting up the machine in order to regulate hydraulically the pressure passing by way of pressure conduit 83 to hydraulic motor 68, the arrangement being such that the hydraulic secondary drives exert sufficient torque to apply a constant tension to the cable 1. In order to provide reading of the pressure, a pressure gauge 121 is inserted in the pressure conduit 83 downstream from the pressure regulator 115.

The pressure-responsive switch 105 is connected to the pressure conduit 83 to monitor the operation of the primary electrical drive motor 21, as explained earlier. The pressure switch 105 includes a bypass conduit 122 leading back to the reservoir 61. Bypass conduit 122 conducts, back to reservoir 61, the hydraulic fluid which bypasses a piston (not shown) of pressure-responsive switch 105 at its pressure setting. The hydraulic fluid pressure, after passing through pressure regulator 115, is conducted by way of pressure conduit 83 to hydraulic motor 68 and is returned to reservoir 61 by way of exhaust conduit 87. As noted, there is provided a drain conduit 88 extending from the motor back to the sump. The drain conduit collects hydraulic fluid which may have seeped past the internal components of the pump, thereby to prevent trapping of pressure fluid within the hydraulic motor 68.

Operation

In setting up the conveyor system, the operating speed of the cable is adjusted by means of the variable speed pulley system 22 (primary drive unit 2) described earlier with reference to FIGURES 2 and 3. The secondary hydraulic drives No. 1 and No. 2 are then adjusted hydraulically to accept their predetermined shares of the conveyor load. For this purpose, the pressure regulator 115 of each secondary drive unit is adjusted to provide the required hydraulic pressure by rotating the adjustment screw 120. When the correct setting is reached, the piston 117 (FIGURE 1) of the regulator will be maintained under just sufficient pressure to cover its port leading to the bypass conduit 119 leading from the pressure regulators 115 back to the reservoir. If any load fluctuation causes a pressure increase, the piston 117 will be forced downwardly against its spring 118 to open the bypass port. It will be understood that each self-contained secondary drive unit 3 is adjusted individually, so that each shares its part of the load with the primary drive unit 2.

Each pressure-responsive switch 105 is also adjustable (knob 109), and in setting up the apparatus, the pressure-responsive switch 105 is adjusted to a setting slightly lower than the setting of the pressure regulator in pounds per square inch, as indicated by the pressure gauge 121. Accordingly, the pressure switches 105—105 will close their contacts to start the electrical primary drive motor 21 when the hydraulic pressure in both secondary drive units 3 reaches a value sufficient to apply energy to the cable at a tension related to the tension to be applied by the primary unit 2.

In setting up the system, the primary drive unit is also adjusted to carry its share of the load in proportion to the secondary drives. This adjustment by rotating the graduated adjustment thimble 51 in a direction to regulate the tension imposed on the variable speed pulley system 22. This adjustment is made while the secondary drive units 3 are operating, the adjustment preferably providing equal pull on the entire cable below the overload setting of the primary drive unit 2 to avoid tripping the overload switch 57. In the absence of the secondary drive units 3, the cable on the downstream side of the primary driving unit 2 would constitute the tension side with the sheave 5 and cable advancing in the direction indicated by the arrow, while slack would exist on the upstream side of the cable as indicated by the arrow. Upon proper adjustment of the secondary drives, the sections or cable runs between the primary and secondary drives are all under substantially the same tension, thereby distributing the forces acting upon the cable and virtually eliminating slackness at any section within the cable run.

Having described our invention, we claim:

1. A driving system for advancing an article conveyor, said driving system being in driving connection with the conveyor at points spaced apart from one another along the conveyor, said driving system comprising:
    a primary driving unit in driving connection with the conveyor and having a primary electrical motor for powering the primary driving unit;
    a secondary driving unit located along the conveyor at a point spaced from the primary driving unit and having a secondary hydraulic motor in driving connection with the conveyor;
    a hydraulic pump forming a part of the secondary driving unit;
    a secondary electrical motor in driving connection with the hydraulic pump;
    a hydraulic circuit interconnecting the hydraulic pump and hydraulic motor of the secondary driving system for transmitting hydraulic pressure from the hydraulic pump to the hydraulic motor;
    hydraulic pressure regulating means interconnected with the said hydraulic circuit for regulating the flow of hydraulic fluid to the hydraulic motor, thereby to regulate the power output of the hydraulic motor;
    the pressure regulating means of the hydraulic circuit adapted to determine the relative force which is applied to the conveyor by the primary and secondary driving units.

2. A driving system for advancing an article conveyor of the overhead type which includes an endless conveyor cable for transporting articles, said driving system comprising:
    a primary driving unit including a primary electrical power motor in driving connection with the conveyor cable for advancing the cable;
    a secondary driving unit located along the cable at a point remote from the primary driving unit and arranged to assist the primary driving unit in advancing the cable;
    said secondary driving unit including a hydraulic power motor in driving connection with the cable for advancing the cable;
    said secondary driving unit having a hydraulic pump and a secondary electrical power motor in driving connection with the hydraulic pump;
    a hydraulic control circuit interconnecting the secondary hydraulic pump with the hydraulic motor for energizing the hydraulic motor;
    an electrical control circuit interconnecting the primary electrical power motor and the secondary electrical power motor for energizing the said motors;
    a pressure-responsive switch interposed in the hydraulic circuit which interconnects the hydraulic pump and hydraulic motor;
    said pressure-responsive switch including contacts interposed in the electrical control circuit;
    said pressure-responsive switch being arranged to close said contacts and to energize the primary electrical motor after the hydraulic pressure within the hydraulic circuit has reached a predetermined factor, whereby the primary motor is energized after the secondary hydraulic motor is placed in operation.

3. A driving system as set forth in claim 2 in which the said pressure-responsive switch of the hydraulic circuit includes manually operated regulating means, said regulating means adapting the contacts of the pressure-responsive switch to close under a predetermined back pressure in the said hydraulic circuit, whereby the primary electrical power motor remains de-energized until the hydraulic secondary driving unit imparts a predetermined tension force to the conveyor cable.

4. A driving system as set forth in claim 2 in which the said pressure-responsive switch of the hydraulic circuit includes manually operated regulating means, said regulating means adapting the contacts of the pressure-responsive switch to close under a predetermined back pressure in the said hydraulic circuit, and in which the hydraulic circuit includes a pressure regulating valve which controls the back pressure of the hydraulic circuit, whereby the primary electrical power motor remains de-energized until the hydraulic secondary driving unit imparts a predetermined tension force to the conveyor cable.

5. A driving system as set forth in claim 2 in which the said pressure-responsive switch includes manually operated regulating means, said regulating means adapting the contacts of the pressure-responsive switch to close under a predetermined back pressure in the said hydraulic circuit, and in which the hydraulic circuit includes a pressure regulating valve arranged to bypass the hydraulic fluid pressure at a predetermined value, whereby the primary electrical power motor remains de-energized until the hydraulic secondary driving unit imparts a predetermined tension force to the conveyor cable.

6. A driving system as set forth in claim 2 in which the said pressure-responsive switch includes manually operated regulating means, said regulating means adapting the contacts of the pressure-responsive switch to close under a predetermined back pressure in the said hydraulic circuit, and in which the hydraulic circuit includes a pressure regulating valve arranged to bypass the hydraulic fluid pressure at a predetermined value, and manual adustment means associated with the pressure regulating alve for regulating the predetermined fluid pressure of he hydraulic circuit, whereby the primary electrical power notor remains de-energized until the hydraulic secondary riving unit imparts a predetermined tension force to the onveyor cable.

7. A driving system for a conveyor as set forth in claim ; in which the hydraulic power motor of the secondary lriving unit is of the positive displacement type and in which the hydraulic circuit of the secondary driving unit which interconnects the hydraulic pump and hydraulic ower motor includes a pressure regulator to regulate the work load which is applied by secondary driving unit to the onveyor cable.

8. A driving system for a conveyor as set forth in laim 2 in which the hydraulic power motor of the secondary driving unit is of the positive displacement type nd in which the hydraulic circuit of the secondary driv- ng unit which interconnects the hydraulic pump and hy- lraulic power motor includes a pressure regulator, said ressure regulator including manually operated control neans for regulating the flow of hydraulic fluid from the ydraulic pump to the hydraulic power motor, thereby to egulate the work load which is applied by secondary riving unit to the conveyor cable.

9. A driving system for a conveyor as set forth in claim in which the hydraulic power motor of the secondary riving unit is a positive displacement unit and in which he hydraulic pump of the secondary driving unit is a posi- ive displacement unit, and in which the hydraulic circuit f the secondary driving unit which interconnects the posi- ive displacement hydraulic pump and the positive dis- lacement hydraulic power motor includes a pressure egulator to regulate the work load which is applied by econdray driving unit to the conveyor cable.

10. A driving ssytem for a conveyor as set forth in laim 2 in which the hydraulic power motor of the secondary driving unit is a positive displacement unit and in which the hydraulic pump of the secondary driving unit ; a positive displacement unit, and in which the hydraulic ircuit of the secondary driving unit which interconnects 1e positive displacement hydraulic pump and the posi- ive displacement hydraulic power motor includes a pres- ure regulator, said pressure regulator including manual- / operated control means for regulating the flow of hy- raulic fluid from the hydraulic pump to the hydraulic notor, thereby to regulate the work load which is applied y secondary driving unit to the conveyor cable.

11. A driving system for a conveyor as set forth in laim 2 in which the primary driving unit includes a great eduction unit having a driving sheave in tracking en- agement with the conveyor cable for advancing the ca- le, said gear reduction unit being in driving connection rom the primary electrical motor and driving said sheave, aid gear reduction unit being movably mounted with respect to the primary drive unit and adapted to shift in response to an overload condition and to de-energize the primary electrical motor.

12. A driving system for a conveyor as set forth in claim 2 in which the primary driving unit includes a gear reduction unit having a driving sheave in tracking engagement with the conveyor cable for advancing the cable, said gear reduction unit being in driving connection from the primary electrical motor and driving said sheave, said gear reduction unit being movably mounted with respect to the primary drive unit, and a normally closed overload unit, said overload switch including electrical contacts interposed in the electrical control circuit, said gear reduction unit being arranged to shift in response to a conveyor overload condition of sufficient intensity to shift the gear reduction drive, the contacts of the overload switch, upon being opened under said overload conditions, causing the electrical control system to decommission the primary electrical power motor.

13. A driving system for a conveyor as set forth in claim 2 in which the secondary driving system includes a frame, a gear reduction unit mounted on said frame and in driving connection with the hydraulic motor, and a sheave in tracking engagement with the conveyor cable, said sheave being in driving connection with the gear reduction unit, whereby the cable is advanced by the hydraulic motor through the gear reduction unit and sheave.

14. A driving system for a conveyor as set forth in claim 2 in which there is provided a plurality of secondary driving units located along the conveyor cable at points spaced apart from one another to accept a predetermined portion of the work load of the conveyor cable.

15. A driving system for a conveyor as set forth in claim 2 in which there is provided a plurality of secondary driving units, each unit having a gear reduction unit in driving connection with the hydraulic motor, and a sheave in driving connection with the gear reduction unit, whereby the cable is advanced by the hydraulic motor through the gear reduction unit and sheave, said plurality of secondary driving units being located along the conveyor cable at points spaced apart from one another to accept a predetermined portion of the work load of the conveyor cable.

References Cited

UNITED STATES PATENTS

| | | | |
|---|---|---|---|
| 2,744,618 | 5/1956 | Seal | 198—203 |
| 3,338,493 | 8/1967 | Schiffer | 60—6 |

RICHARD E. AEGERTER, Primary Examiner

R. S. GAITHER, Assistant Examiner

U.S. Cl. X.R.

60—10.5

UNITED STATES PATENT OFFICE
CERTIFICATE OF CORRECTION

Patent No. 3,500,990        Dated March 17, 1970

Inventor(s) R. B. Vogt et al

It is certified that error appears in the above-identified patent and that said Letters Patent are hereby corrected as shown below:

Claim 10, Line 1, change "ssytem" to - - system - -

Claim 11, Line 2, change "great" to - - gear - -

Claim 12, Line 11, after "overload" insert - - switch connected mechanically to said gear reduction - -

SIGNED AND
SEALED
AUG 25 1970

(SEAL)
Attest:

Edward M. Fletcher, Jr.
Attesting Officer

WILLIAM E. SCHUYLER, JR.
Commissioner of Patents